(12) United States Patent
Yasuhara

(10) Patent No.: US 8,763,135 B2
(45) Date of Patent: Jun. 24, 2014

(54) DOCUMENT PROCESSING APPARATUS, DOCUMENT PROCESSING METHOD, AND COMPUTER-EXECUTABLE PROGRAM

(75) Inventor: Hiroshi Yasuhara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1449 days.

(21) Appl. No.: 11/620,941

(22) Filed: Jan. 8, 2007

(65) Prior Publication Data

US 2007/0180053 A1 Aug. 2, 2007

(30) Foreign Application Priority Data

Jan. 19, 2006 (JP) ................................ 2006-011647

(51) Int. Cl.
*G06F 21/00* (2013.01)
(52) U.S. Cl.
USPC ............................... 726/26; 705/51; 358/468
(58) Field of Classification Search
CPC ............................. G06F 21/10; H04N 1/00204
USPC ................................ 705/51; 726/26; 358/468
See application file for complete search history.

(56) References Cited

U.S. PATENT DOCUMENTS

| 2002/0141380 A1* | 10/2002 | Koguchi ........................ 370/351 |
| 2003/0105950 A1* | 6/2003 | Hirano et al. ................. 713/100 |
| 2004/0051896 A1* | 3/2004 | Saitoh et al. .................. 358/468 |
| 2004/0184075 A1* | 9/2004 | Hayashi et al. ............... 358/402 |
| 2005/0171914 A1* | 8/2005 | Saitoh ............................. 705/51 |
| 2007/0056034 A1* | 3/2007 | Fernstrom ....................... 726/20 |
| 2007/0061264 A1* | 3/2007 | Yeung et al. ..................... 705/51 |

FOREIGN PATENT DOCUMENTS

JP 2003-205661 A 7/2003

* cited by examiner

*Primary Examiner* — Jeffrey Pwu
*Assistant Examiner* — Thong Truong
(74) *Attorney, Agent, or Firm* — Canon USA Inc. IP Division

(57) ABSTRACT

An apparatus is configured to acquire document domain information indicating a domain to which a document belongs, and to acquire destination domain information indicating a destination domain. The apparatus is further configured to determine whether to allow transmission of the document to the destination domain based on the document domain information and the destination domain information, and to transmit the document to the destination domain if transmission of the document is allowed.

23 Claims, 11 Drawing Sheets

| | | |
|---|---|---|
| *801a* | Domain | A |
| *801b* | Trust | Permit |
| *801c* | Send | Deny |
| *801d* | Copy | Permit |
| *801e* | Print | Permit |

FIG.10A

|   |   |
|---|---|
| Domain | A |

1001a → (left cell), 1001 (table label)

FIG.10B

|   |   |
|---|---|
| Trust | Permit |
| Send | Deny |
| Copy | Permit |
| Print | Permit |

1002a, 1002b, 1002c, 1002d (row labels); 1002 (table label)

DOCUMENT PROCESSING APPARATUS, DOCUMENT PROCESSING METHOD, AND COMPUTER-EXECUTABLE PROGRAM

BACKGROUND OF THE INVENTION

1. Field of the Invention

The present invention generally relates to a document processing apparatus, a document processing method, and a computer-executable program. More particularly, the present invention relates to a document processing apparatus, a document processing method, and a computer-executable program, which are useful for restricting transmission of a document depending on a destination.

2. Description of the Related Art

To prevent illegal copying or leakage of a document, a copy-forgery-inhibited pattern, a digital watermarking, or the like can be applied to the document to achieve restriction of access to the document.

When the document is in an electronic form, operations available for a user such as viewing or editing can be controlled by checking each user's right to access the document.

In recent years, a document can be scanned with an image forming apparatus and the scanned data can be transmitted in an electronic form via a network.

Japanese Patent Application Laid-Open No. 2003-205661 discusses a method in which, when a hard copy of a document is produced, copy-protection information is embedded in the hard copy. Such copy-protection information includes information on the document or on an image forming apparatus that produces the hard copy.

According to this method, when copying the hard copy, the image forming apparatus analyzes the copy-protection information embedded in the hard copy. The image forming apparatus determines whether the hard copy is permitted to be copied according to a result of the analysis. In this way, illegal copying can be prevented. For example, based on the copy-protection information, the image forming apparatus determines whether the hard copy is permitted to be copied for use exclusively in house.

As described above, the method discussed in Japanese Patent Application Laid-Open No. 2003-205661 can limit an image forming apparatus or a user that can produce a copy by utilizing copy-protection information.

However, according to the method discussed in Japanese Patent Application Laid-Open No. 2003-205661, since copying is restricted according to a relationship between an image forming apparatus which produces copy and a document which is to be copied, it is difficult to control a destination of the document when the document is transmitted using the image forming apparatus.

SUMMARY OF THE INVENTION

Embodiments of the present invention are directed to facilitating restricting a destination of a document.

According to an aspect of the present invention, an apparatus includes a first acquisition unit configured to acquire document domain information, the document domain information indicating a domain to which a document belongs (e.g., the domain from which the document is being transmitted), a second acquisition unit configured to acquire destination domain information, the destination domain information indicating a destination domain, a determination unit configured to determine whether to allow transmission of the document to the destination domain based on the document domain information acquired by the first acquisition unit and the destination domain information acquired by the second acquisition unit, and a transmission unit configured to transmit the document to the destination domain if transmission of the document is allowed by the determination unit.

According to another aspect of the present invention, an apparatus includes a first acquisition unit configured to acquire document location information, the document location information indicating a location to which a document belongs, a second acquisition unit configured to acquire destination information, the destination information indicating a destination location, a determination unit configured to determine whether to allow transmission of the document to the destination location based on the document information acquired by the first acquisition unit and the destination information acquired by the second acquisition unit, and a transmission unit configured to transmit the document to the destination location if transmission of the document is allowed by the determination unit.

According to yet another aspect of the present invention, a method includes acquiring document domain information, the document domain information indicating a domain to which a document belongs, acquiring destination domain information, the destination domain information indicating a destination domain, determining whether to allow transmission of the document to the destination domain based on the acquired document domain information and the acquired destination domain information, and transmitting the document to the destination domain if transmission of the document is allowed.

According to still another aspect of the present invention, a computer-readable medium storing instructions which, when executed by an apparatus, causes the apparatus to perform operations including acquiring document domain information, the document domain information indicating a domain to which a document belongs, acquiring destination domain information, the destination domain information indicating a destination domain, determining whether to allow transmission of the document to the destination domain based on the acquired document domain information and the acquired destination domain information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 8 illustrates an example of a table containing domain information and access restriction information and embedded in a document according to the first exemplary embodiment of the present invention.

FIGS. 10A and 10B illustrate examples of information embedded in a document and information stored by a multifunction peripheral or an information processing apparatus according to a second exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
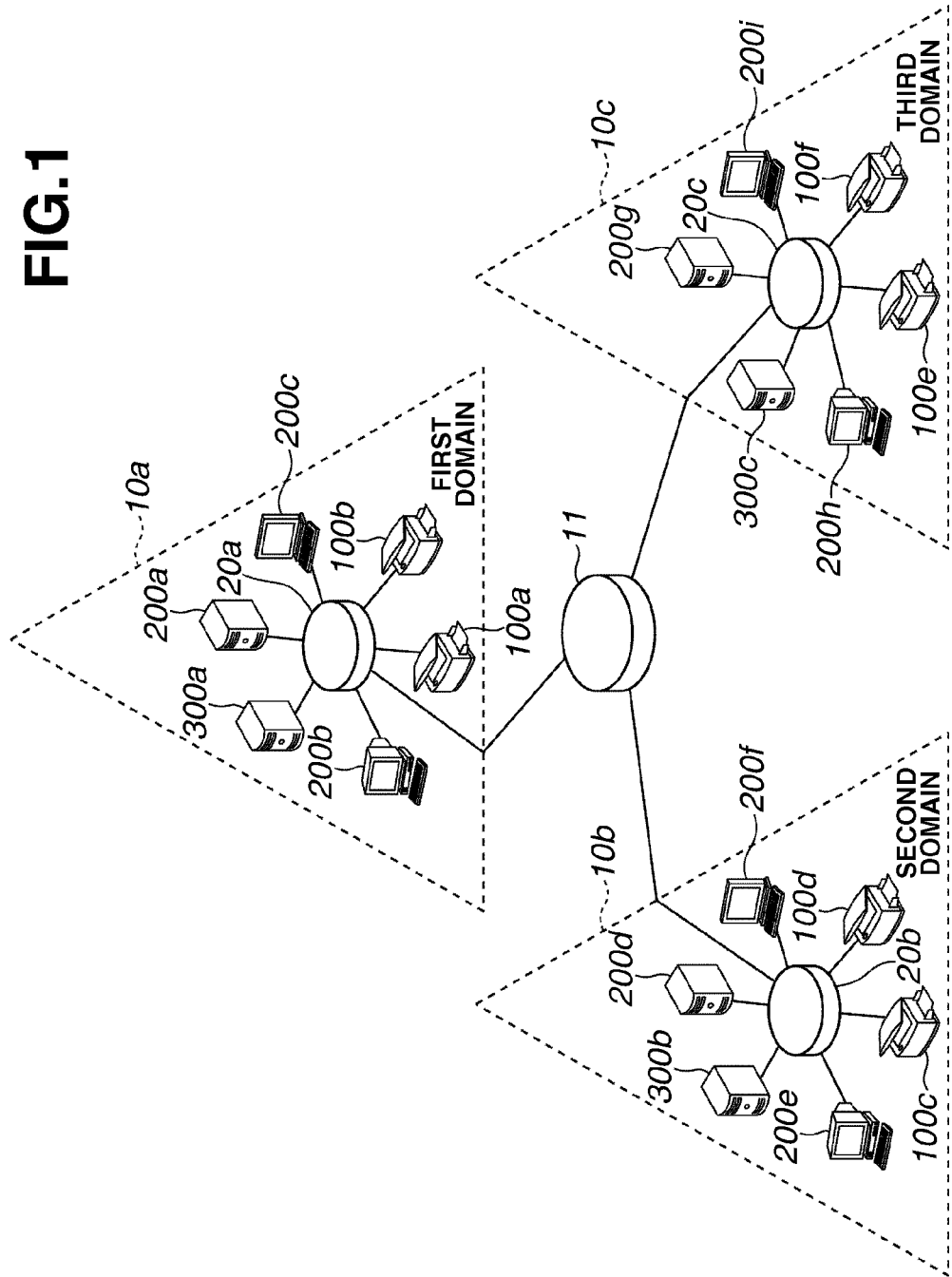
FIG. 1 illustrates an example of a network system configuration according to a first exemplary embodiment of the present invention.

FIG. 1 illustrates an example of a configuration of a network system according to a first exemplary embodiment of the present invention.

In FIG. 1, a plurality of domains (a first domain 10*a*, a second domain 10*b*, and a third domain 10C) are interconnected via a network (e.g., the Internet) 11.

In FIG. 1, multifunction peripherals 100*a* and 100*b*, information processing apparatuses 200*a*-200*c*, and a domain controller 300*a* are provided in the first domain 10*a*. Multifunction peripherals 100*c* and 100*d*, information processing apparatuses 200*d*-200*f*, and a domain controller 300*b* are provided in the second domain 10*b*. Multifunction peripherals 100*e* and 100*f*, information processing apparatuses 200*g*-200*i*, and a domain controller 300*c* are provided in the third domain 10*c*. The multifunction peripherals 100*a* and 100*b*, the information processing apparatuses 200*a*-200*c*, and the domain controller 300*a* are interconnected via a local network (e.g., LAN) 20*a*. The multifunction peripherals 100*c* and 100*d*, the information processing apparatuses 200*d*-200*f*, and the domain controller 300*b* are interconnected via a local network 20*b*. The multifunction peripherals 100*e* and 100*f*, the information processing apparatuses 200*g*-200*i*, and the domain controller 300 care interconnected via a local network 20*c*. The multifunction peripherals 100*a*-100*f*, the information processing apparatuses 200*a*-200*i*, and the domain controllers 300*a*-300*c* in the first domain 10*a*, the second domain 10*b*, and the third domain 10*c* communicate with one another via the network 11 and the local networks 20*a*-20*c*.

In the first exemplary embodiment, the first domain 10*a* and the third domain 10*c* are in a trust relationship. The trust relationship between the first domain 10*a* and the third domain 10*c* is established, for example, when information such as "the second domain 10*b* is trustable" is input to the domain controller 300*c* in the third domain 10*c*. More specifically, for example, the domain controller 300*c* in the third domain 10*c* transmits a request for trust relationship to the domain controller 300*a* in the first domain 10*a*.

Then, when the domain controller 300*a* in the first domain 10*a* accepts that request, the third domain 10*c* and the first domain 10*a* enter into a trust relationship. When the trust relationship is established, the domain controller 300*c* in the third domain 10*c* and the domain controller 300*a* in the first domain 10*a* store trust relationship establishment information in their storage media. Thus, the multifunction peripherals 100*a* and 100*b* and the information processing apparatuses 200*a*-200*c* in the first domain 10*a* can refer to the trust relationship establishment information stored in the domain controller 300*a*. Similarly, the multifunction peripherals 100*e* and 100*f* and the information processing apparatuses 200*g*-200*i* in the third domain 10*c* can refer to the trust relationship establishment information stored in the domain controller 300*c*.

It is to be noted that, a multifunction peripheral 100 or an information processing apparatus 200 which is not involved in the operation dealing with a document is called an external processing apparatus in the first exemplary embodiment.

Further, the number of the domains 10*a*-10*c*, the number and type of the multifunction peripherals 100*a*-100*f*, the information processing apparatuses 200*a*-200*i*, and the domain controllers 300*a*-300*c* in the domains 10*a*-10*c*, and also the network connection between the domains 10*a*-10*c* are exemplary and not to be construed as limited to those shown in FIG. 1.

Figure 2:
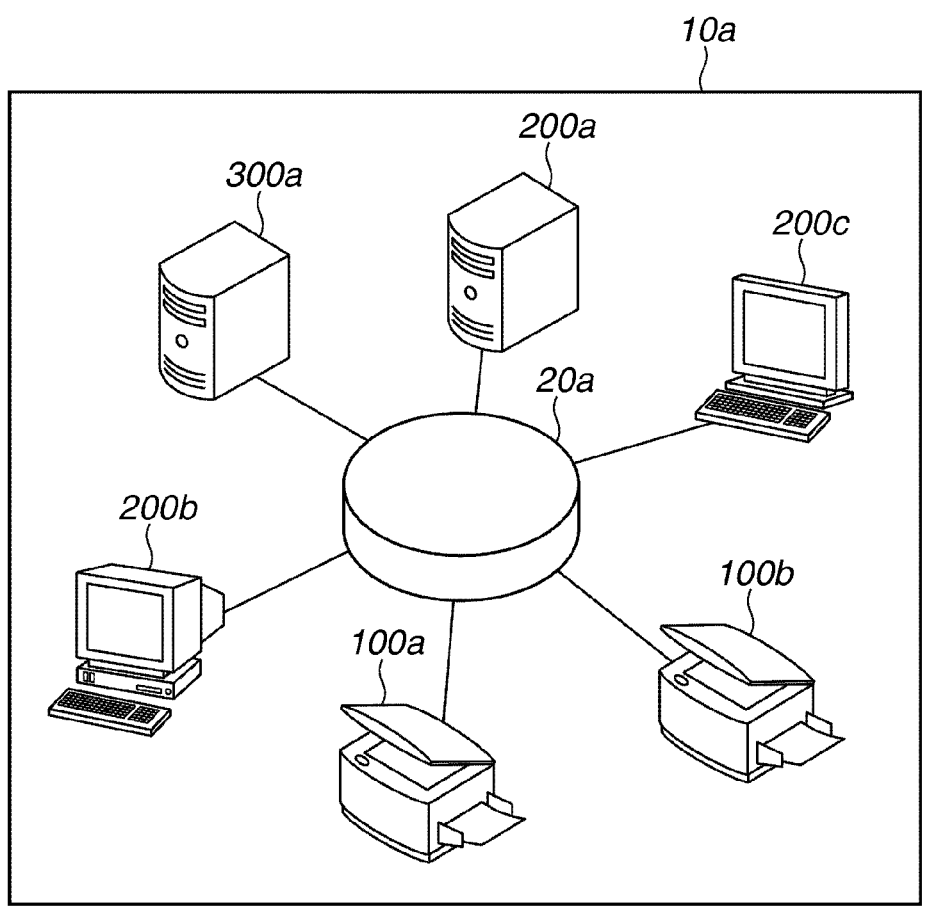
FIG. 2 illustrates an example of an information processing apparatus, a multifunction peripheral, and a domain controller in a first domain according to the first exemplary embodiment of the present invention.

FIG. 2 illustrates an example of the multifunction peripherals 100*a* and 100*b*, the information processing apparatuses 200*a*-200*c*, and the domain controller 300*a* in the first domain 10*a*. It is to be noted that since the multifunction peripherals 100*c*-100*f*, the information processing apparatuses 200*d*-200*i*, and the domain controllers 300*b* and 300*c* in the second domain 10*b* and the third domain 10*c* are similar to those in the first domain 10*a*, their description is omitted for simplification.

In FIG. 2, the domain controller 300*a* controls the information processing apparatuses 200*a*-200*c* and the multifunction peripherals 100*a* and 100*b* in the first domain 10*a*. The multifunction peripherals 100*a* and 100*b* are exemplary document processing apparatuses. As described above, the domain controller 300*a*, the information processing apparatuses 200*a*-200*c*, and the multifunction peripherals 100*a* and 100*b* are interconnected via the network (eg., LAN) 20*a*.

Figure 3:
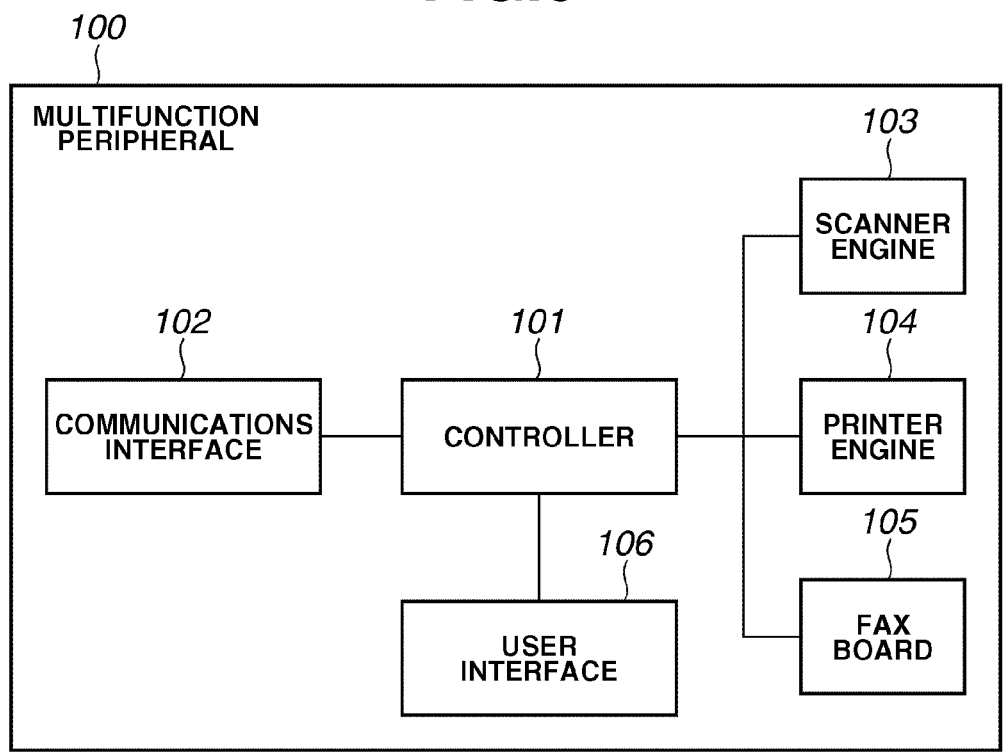
FIG. 3 is a block diagram showing an example of an overall configuration of a multifunction peripheral according to the first exemplary embodiment of the present invention.

FIG. 3 is a block diagram illustrating an example of an overall configuration of the multifunction peripheral 100.

In FIG. 3, a controller 101 controls the multifunction peripheral 100. The controller 101 includes a hardware configuration such as the one shown in FIG. 4.

A communications interface 102 allows the controller 101 to communicate outside of the multifunction peripheral 100. The communications interface 102 can be a universal serial bus (USB) interface, an Ethernet® interface, or an IEEE 1284 interface, but may also be a different type of communications interface.

A scanner engine 103 is configured for the multifunction peripheral 100 to function as a scanner and is controlled by the controller 101.

A printer engine 104 is configured for the multifunction peripheral 100 to function as a printer and is controlled by the controller 101. The printer can be a laser beam printer or an inkjet printer, but may also be a different type of printer.

A fax board 105 is configured for the multifunction peripheral 100 to function as a fax machine by controlling transmission of an image. The fax board 105 is controlled by the controller 101.

Figure 4:
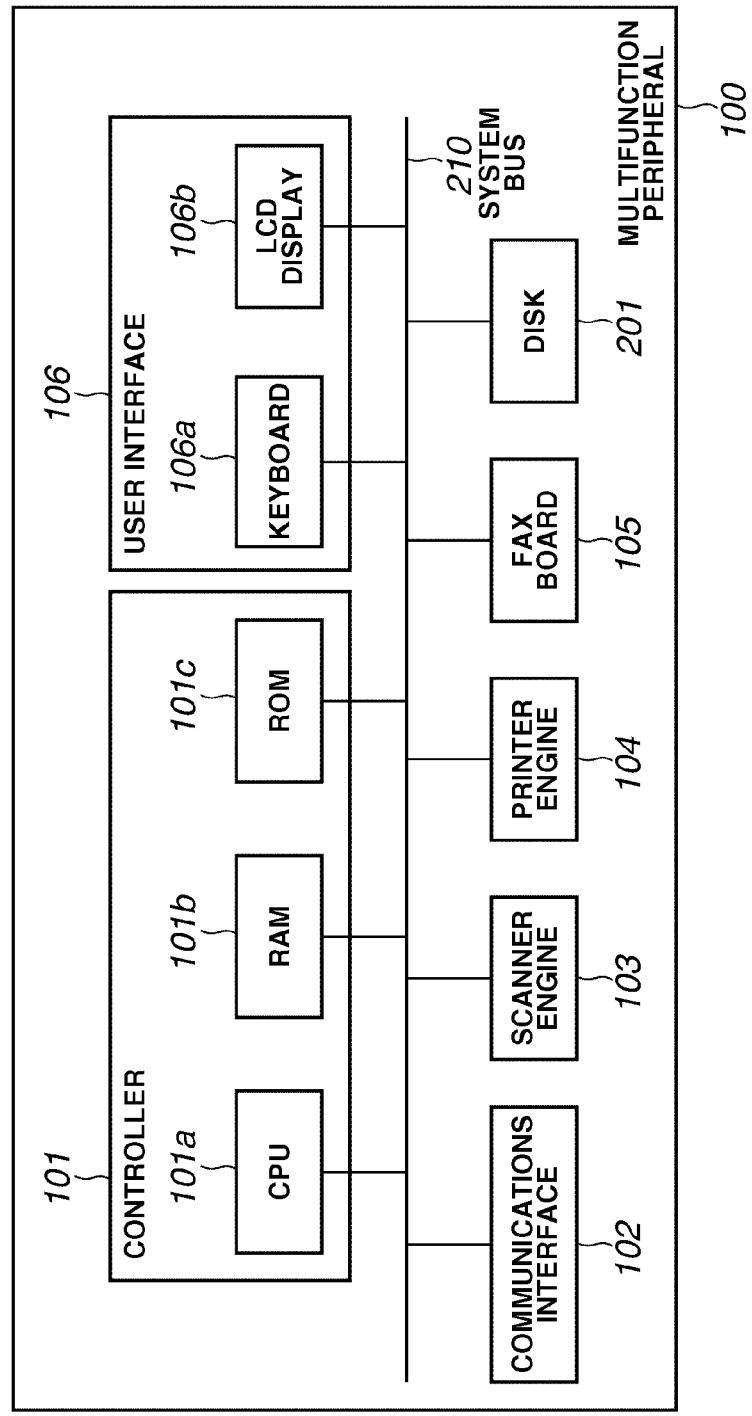
FIG. 4 is a block diagram showing an example of a hardware configuration of a controller according to the first exemplary embodiment of the present invention.

A user interface 106 includes a liquid crystal display (LCD) 106b and a keyboard 106a (see FIG. 4). The user interface 106 displays an image based on information output from the controller 101 and transmits an operation instruction entered by a user to the controller 101. The LCD 106b functions also as a touch panel. An operating instruction entered by the user through this touch panel can be transmitted to the controller 101 through the user interface 106.

The multifunction peripheral 100 having the above configuration selects the printer engine 104 to issue a print job. The multifunction peripheral 100 also selects the scanner engine 103 to issue a scan job. Further, the multifunction peripheral 100 selects the printer engine 104 and the scanner engine 103 to issue a copy job. Furthermore, the multifunction peripheral 100 selects the printer engine 104, the scanner engine 103, and the fax board 105 to issue a fax reception job or a fax transmission job.

FIG. 4 is a block diagram illustrating an example of a hardware configuration of the controller 101 shown in FIG. 3.

In FIG. 4, the controller 101 includes a central processing unit (CPU) 101a, a random access memory (RAM) 101b, and a read-only memory (ROM) 101c. The controller 101, the user interface 106, the communications interface 102, the scanner engine 103, the printer engine 104, the fax board 105, and a disk 201 are interconnected via a system bus 210.

A control program for controlling the controller 101 is stored in the ROM 101c or the disk 201. The control program is read out to the RAM 101b when necessary and executed by the CPU 101a. The ROM 101c and the disk 201 store attribute information indicating a function and a state of the multifunction peripheral 100, attribute information indicating a job processed by the multifunction peripheral 100, and job data which is to be output, as well as the control program. Further, the CPU 101a produces an image to be displayed on the LCD 106b. When a user operates the LCD 106b or the keyboard 106a according to an image displayed on the LCD 106b, the CPU 101a allows outside communication through the communications interface 102.

Furthermore, a setting value of a domain of the multifunction peripheral 100 is stored in the disk 201. In the present case, the setting value of a domain is, for example, a domain name. Taking a JP domain as an example, an organizational type JP domain name, a geographic type JP domain name, or a general-use JP domain name can be used as a domain setting value. The domain setting value is stored in the disk 201 by the user via a user interface (keyboard, etc.) of the multifunction peripheral 100 or a computer of the information processing apparatus 200, etc.

In the first exemplary embodiment, unless expressly stated otherwise, the CPU 101a receives an instruction from a user from the keyboard 106a through the system bus 210. Also, the CPU 101a controls the RAM 101b, the LCD 106b, the ROM 101c, the communications interface 102, the scanner engine 103, the printer engine 104, the fax board 105, and the disk 201.

Figure 5:
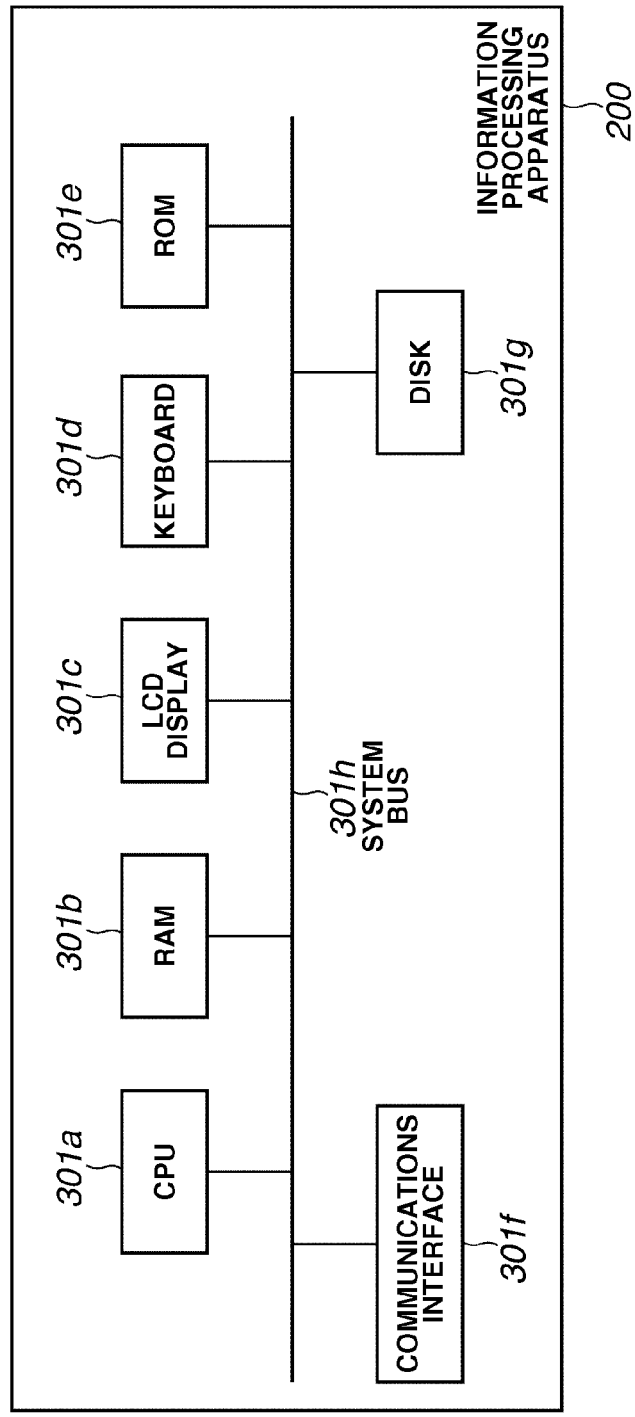
FIG. 5 is an example of a hardware configuration of an information processing apparatus according to the first exemplary embodiment of the present invention.

FIG. 5 illustrates an example of a hardware configuration of the information processing apparatus 200.

In FIG. 5, a CPU 301a, a RAM 301b, an LCD 301c, a keyboard 301d, a ROM 301e, a communications interface 301f, and a disk 301g are interconnected through a system bus 301h.

A control program for controlling the information processing apparatus 200 is stored in the ROM 301e or the disk 301g. The control program is read out to the RAM 301b when necessary and executed by the CPU 301a. In addition to the control program, various types of data are stored in the ROM 301e and the disk 301g.

Further, the CPU 301a displays an image on the LCD 301c. When a user operates the keyboard 301d according to an image displayed on the LCD 301c, the CPU 301a accepts the user's instruction based on the operation. In addition, the CPU 301a allows outside communication through the communications interface 301f.

It is to be noted that a hardware configuration of the domain controller 300 is similar to that shown in FIG. 5. The domain controller 300 controls the domain 10 it belongs to. The control of the domain 10 is, for example, to manage the multifunction peripheral 100 and the information processing apparatus 200 in the domain 10. All the multifunction peripherals 100 and the information processing apparatuses 200 in the domain 10 are managed by the domain controller 300 in the domain 10. Thus, for example, when a multifunction peripheral or an information processing apparatus refers to data in a different multifunction peripheral or an information processing apparatus, such data can be obtained through the domain controller 300.

Figure 6:
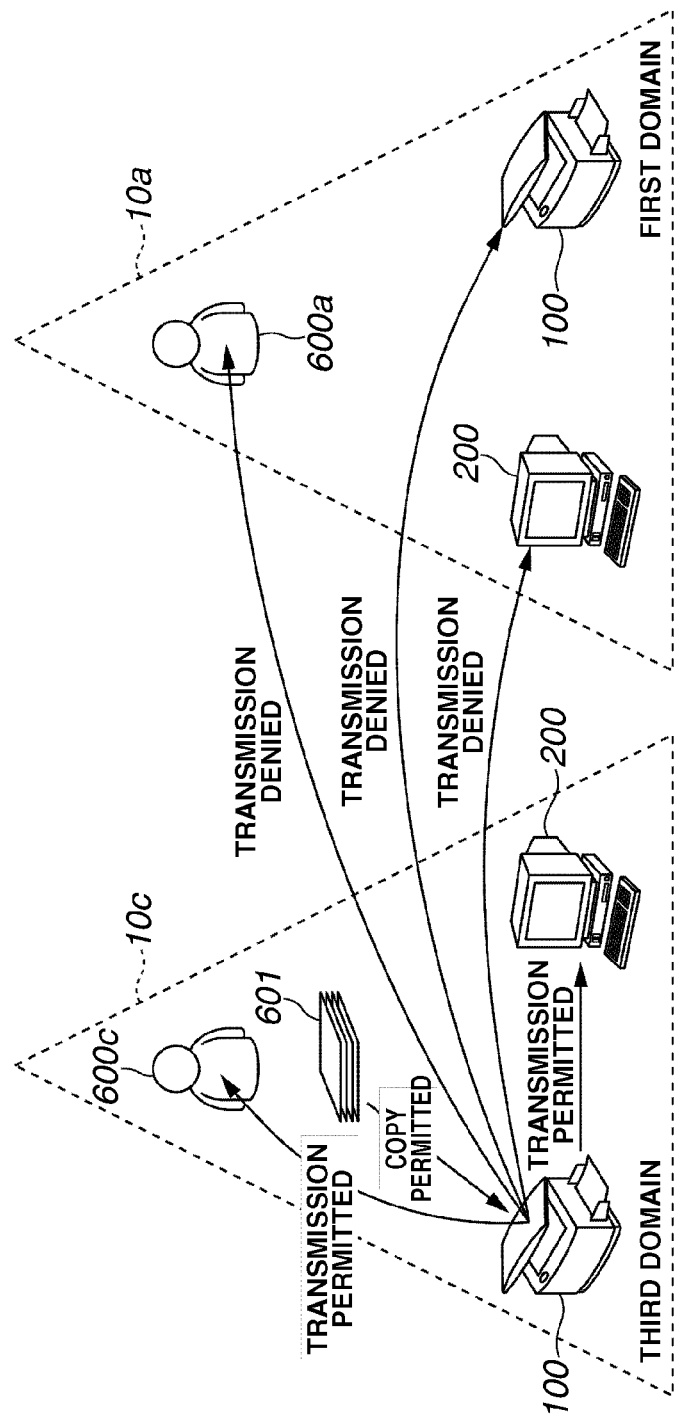
FIG. 6 is an example of an access restriction method when a multifunction peripheral in a third domain deals with a document which belongs to the third domain according to the first exemplary embodiment of the present invention.
Figure 7:
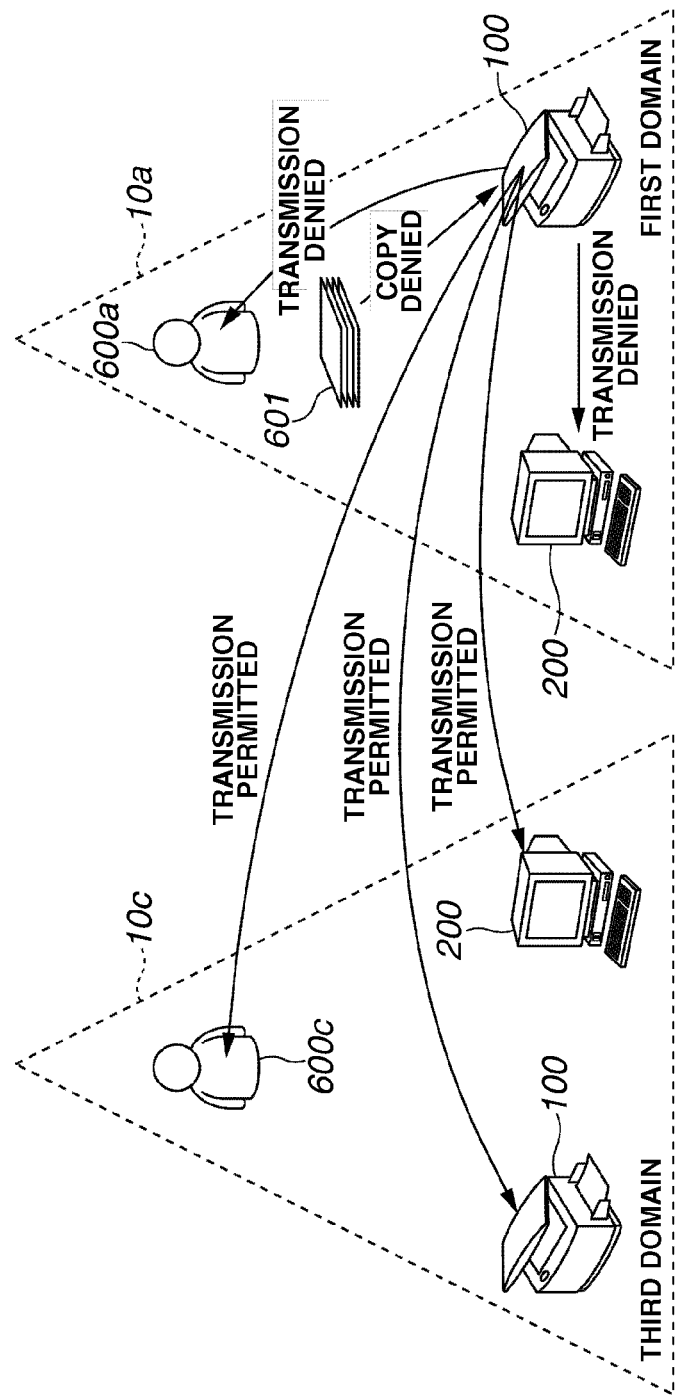
FIG. 7 illustrates an example of an access restriction method when the multifunction peripheral in the first domain deals with the document which belongs to the third domain according to the first exemplary embodiment of the present invention.

FIG. 6 illustrates an example of an access restriction method when a multifunction peripheral 100 (multifunction peripheral 100e or 100f in FIG. 1) in the third domain 10c deals with a document which belongs to the third domain 10c. FIG. 7 shows an example of an access restriction method when a multifunction peripheral 100 (multifunction peripheral 100a or 100b in FIG. 1) in the first domain 10a deals with a document which belongs to the third domain 10c.

In FIGS. 6 and 7, a document 601 is embedded with a table containing domain information and access restriction information.

FIG. 8 illustrates an example of a table containing domain information and access restriction information and embedded in the document 601. When the document 601 is a hard-copy-type medium, the information contained in the table 801 shown in FIG. 8 is recorded physically on the document 601 implementing such a technique as QR code, a digital watermarking, a copy-forgery-inhibited pattern, or the like. When the document 601 is based on electronic data, the information contained in the table 801 shown in FIG. 8 is incorporated in the electronic data. The information processing apparatus 200 or a computer having a similar function can be used to make the document 601 embedded with the information contained in table 801.

In FIG. 8, a domain to which the document 601 belongs is entered in a Domain field 801a of the table 801. In FIG. 8, "A" which represents the third domain 10c is entered in the Domain field 801a. In a Trust field 801b, a status of access restriction to a domain in a trust relationship is entered as access restriction information. In FIG. 8, "Permit" is entered in the Trust field 801b if there is no access restriction to a domain in a trust relationship whereas "Deny" is entered when there is access restriction.

When "Permit" is entered in the Trust field 801b, a domain in a trust relationship is treated the same as the domain entered in the Domain field 801a. If "Deny" is entered in the Trust field 801b, access is permitted only to the domain which is entered in the Domain field A and access is controlled even to the domain in a trust relationship according to what is entered in each of the fields 801c-801e.

In a Send field 801c, a status of access restriction regarding transmission of the document 601 is entered. In a Copy field 801d, a status of access restriction regarding copying of the document 601 is entered. In a Print field 801e, a status of access restriction regarding printing of the document 601 is entered. If there is no access restriction, "Permit" is entered in each of the fields 801c-801e whereas "Deny" is entered when there is access restriction.

For example, if "Permit" is entered in the Send field 801c, the document 601 can be transmitted to a multifunction peripheral 100, an information processing apparatus 200, or a user in a domain other than the domain the document 601 belongs to. On the other hand, if "Deny" is entered in the Send field 801c, the document 601 is not allowed to be transmitted to a multifunction peripheral 100, an information processing apparatus 200, or a user in a domain other than the domain the document 601 belongs to.

If "Permit" is entered in the Copy field 801d, the document 601 can be copied by a multifunction peripheral 100 (image forming apparatus) in a domain other than the domain the document 601 belongs to. On the other hand, if "Deny" is entered in the Copy field 801d, the document 601 is not allowed to be copied by a multifunction peripheral 100 in a domain other than the domain the document 601 belongs to.

If "Permit" is entered in the Print field 801e, the document 601 can be printed by a multifunction peripheral 100 (image forming apparatus) in a domain other than the domain the document 601 belongs to. On the other hand, if "Deny" is entered in the Print field 801e, the document 601 is not allowed to be printed by a multifunction peripheral 100 in a domain other than the domain the document 601 belongs to.

FIGS. 6 and 7 show a case where "A", which represents the third domain 10c, is entered in the Domain field 801a and "Deny" is entered in the Trust field 801b, the Send field 801c, the Copy field 801d, and the Print field 801e. As described above, the first domain 10a and the third domain 10c are in a trust relationship.

Then, referring FIG. 6, the document 601 can be copied or printed by the multifunction peripheral 100 (100e or 100f in FIG. 1) in the third domain 10c. Also, the document 601 can be transmitted to the information processing apparatus 200 (200g-200i in FIG. 1), the multifunction peripheral 100 (100e or 100f in FIG. 1), and a user 600c in the third domain 10c, but not to the information processing apparatus 200 (200a-200c in FIG. 1), the multifunction peripheral 100 (10a or 100b in FIG. 1), and a user 600a in the first domain 10a.

In FIG. 7, the document 601 is not allowed to be copied or printed by the multifunction peripheral 100 (10a or 100b in FIG. 1) in the first domain 10a. Also, the document 601 is not allowed to be transmitted to the information processing apparatus 200 (200a-200c in FIG. 1) and the user 600a in the first domain 10a. On the other hand, the document 601 can be transmitted to the information processing apparatus 200 (200g-200i in FIG. 1) and the user 600c in the third domain 10c. Also, the document 601 can be transmitted to and printed by the multifunction peripheral 100 (100e or 100f in FIG. 1) in the third domain 10c.

If "Permit" is entered in the Trust field 801b of the table 801, the transmission of the document 601 to the multifunction peripheral 100 (100a or 100b in FIG. 1), the information processing apparatus 200 (200a-200c in FIG. 1), and the user 600a in the first domain 10a is not restricted. Also, copying and printing of the document 601 by the multifunction peripheral 100 (100a or 100b in FIG. 1) in the first domain 10a is not restricted. This is because, as described earlier, the first domain 10a and the third domain 10c are in a trust relationship.

It is to be noted that the configuration of the table 801, the access restriction items, and the information indicating whether access restriction is to be performed in the table 801 are exemplary and shall not be construed as limited to those shown in FIG. 8.

Figure 9:
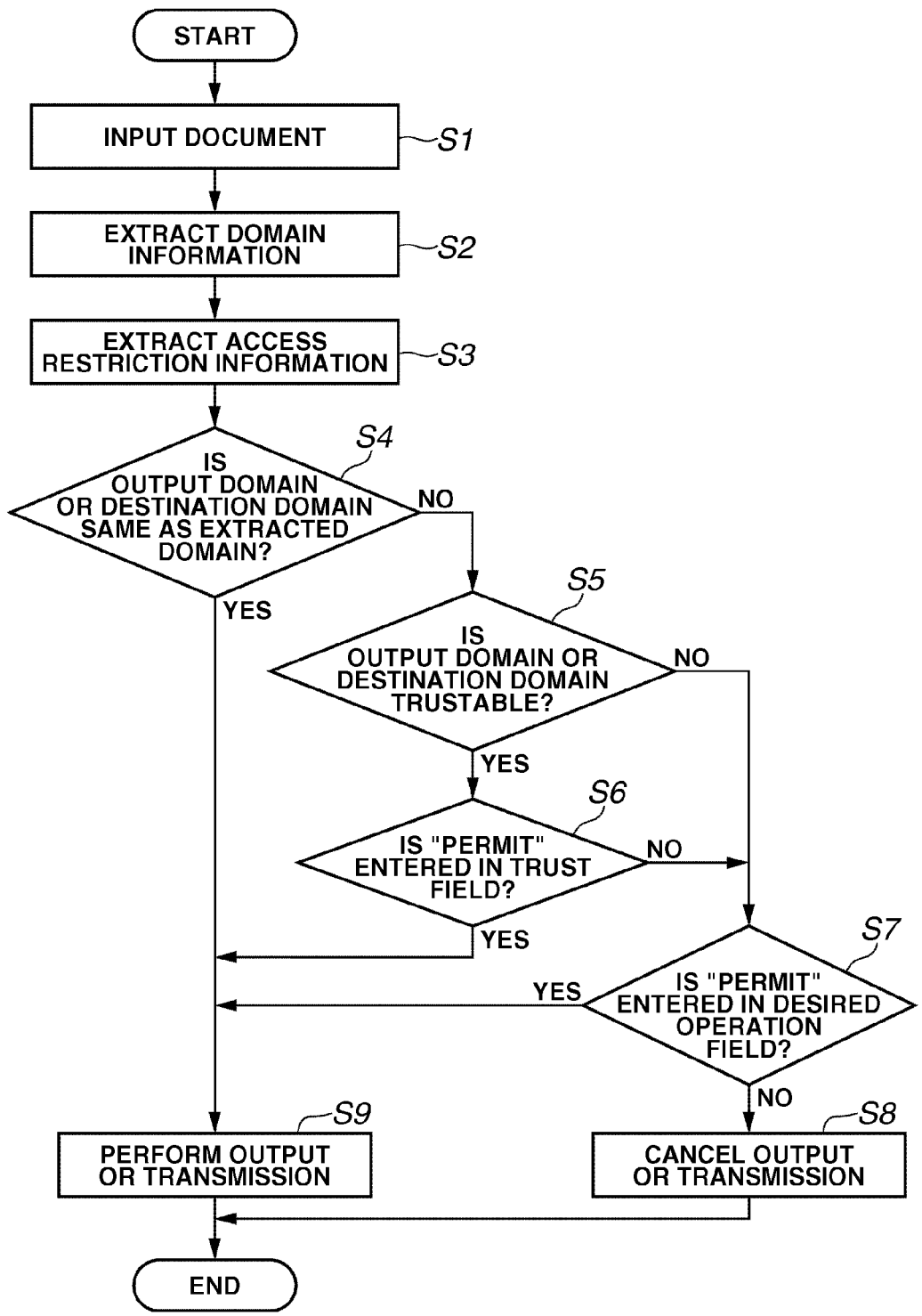
FIG. 9 is a flowchart showing an example of processing in a network system which performs access restriction according to the first exemplary embodiment of the present invention.

FIG. 9 is a flowchart showing an example of processing in a network system when access restriction is performed. In FIG. 9, the multifunction peripheral 100 is taken as an example of an apparatus which manages the document 601 by performing access restriction.

In step S1, data of the document 601 is input into the multifunction peripheral 100. When the document 601 is a physical medium such as paper, the scan engine 103 scans the document 601 to generate image data. Then, the CPU 101a loads the generated image data to the RAM 101b. When the document 601 is electronic data (hereinafter referred to as image data), the CPU 101a loads the image data input through the communications interface 102 or the image data stored in the disk 201 to the RAM 101b.

In step S2, the CPU 101a extracts the table 801 embedded in the image data loaded to the RAM 101b in step S1. Then, the CPU 101a extracts the domain information entered in the Domain field 801a from the table 801.

In step S3, the CPU 101a extracts the access restriction information entered in the Trust field 801b, the Send field 801c, the Copy field 801d, and the Print field 801e from the table 801 extracted in step S2.

In step S4, if the CPU 101a determines to copy or print the document 601, the CPU 101a extracts the domain information of a multifunction peripheral 100 which performs copying or printing from, for example, the disk 201. Also, if the CPU 101a determines to transmit the document 601, the CPU 101a extracts a domain of a destination apparatus, for example, from mail addresses of the destination apparatuses. Then, the CPU 101a determines whether the domain of the multifunction peripheral 100 which performs copying or printing or the domain of the destination apparatus (e.g., the information processing apparatus 200) and the domain extracted in step S2 are the same.

As a result of this determination, if the domain of the multifunction peripheral 100 which performs copying or printing or the domain of the destination apparatus and the domain extracted in step S2 are the same, the process proceeds to step S9. In step S9, the CPU 101a controls the multifunction peripheral 100 which performs copying or printing based on the image data of the document 601 or transmits the image data of the document 601 to the destination apparatus through the communications interface 102. In this manner, the multifunction peripheral 100 can copy or print the document 601 and the destination apparatus can receive the image data of the document 601.

It is to be understood that, in step S9, the CPU 101a causes the scanner engine 103 and the printer engine 104 to copy or print the document 601.

On the other hand, if the domain of the multifunction peripheral 100 which performs copying or printing or the domain of the destination apparatus and the domain extracted in step S2 are not the same, the process proceeds to step S5. In step S5, the CPU 101a determines whether the domain of the multifunction peripheral 100 which performs copying or printing or the domain of the destination apparatus and the domain extracted in step S2 are in a trust relationship. As described above, the CPU 101a makes this determination according to the trust relationship establishment information stored in the domain controller 300 in the domain to which the CPU 101a belongs.

As a result of this determination, if the domain of the multifunction peripheral 100 which performs copying or printing or the domain of the destination apparatus and the domain extracted in step S2 are not in a trust relationship, the process proceeds to step S7.

On the other hand, if the domain of the multifunction peripheral 100 which performs copying or printing or the domain of the destination apparatus and the domain extracted in step S2 are in a trust relationship, the process proceeds to step S6. In step S6, the CPU 101a determines whether the information entered in the Trust field 801b is "Permit" based on the access restriction information extracted in step S3. As a result of this determination, if the information in the Trust field 801b is "Permit", access restriction is not performed and the process proceeds to the aforementioned step S9.

On the other hand, if the information entered in the Trust field 801b is not "Permit" but "Deny", the process proceeds to step S7.

In step S7, the CPU 101a checks the access restriction information extracted in step S3 and determines whether the information entered in the field corresponding to the operation to be performed (any operation from 801c to 801e) is "Permit". As a result of this determination, if the information entered in the field of the operation to be performed is "Permit", the process proceeds to the aforementioned step S9.

On the other hand, if the field of the operation to be performed is not "Permit" but "Deny", the process proceeds to step S8. In step S8, the CPU 101a cancels processing for the operation which is to be performed.

It is to be noted that FIG. 9 shows merely an example of processing in a network system when an access restriction is performed. For example, in addition to the multifunction peripheral 100, an information processing apparatus 200 may also be used to perform the access restriction according to the flowchart shown in FIG. 9. In this case, by replacing the CPU 101a with the CPU 301a, the RAM 101b with the RAM 301b, the disk 201 with the disk 301g, and the communications interface 102 with the communications interface 301f, an access restriction similar to that shown in FIG. 9 can be achieved.

According to the first exemplary embodiment described above, the domain information and access restriction information is embedded in the document 601, and based on that embedded domain information and access restriction information, copying, printing, and transmission of the document 601 can be controlled. In this way, access restriction to a different user or a multifunction peripheral 100 can be achieved without modifying the embedded information in the document 601. Consequently, enhanced access restriction to the document 601 can be achieved compared to the conventional method.

Also, according to the first exemplary embodiment, a trust relationship is established between the domains, the domain controller 300 which belongs to such domain stores information that such trust relationship is established, and access restriction is achieved using the stored trust relationship establishment information. In this way, content of the access restriction can be changed or access can be controlled even to domains other than the domain entered in the table 801 embedded in the document 601.

Further, according to the first exemplary embodiment, domain information can be embedded in a physical medium (hard copy) such as paper but can also be implemented in electronic data. In this manner, access control can be achieved even when the document 601 is in an electronic form or a physical medium. Therefore, for example, access restriction of transmission of not only a physical medium but also electronic data can be performed.

Furthermore, according to the first exemplary embodiment, when the CPU 101 determines to transmit the document 601, the domain of the destination apparatus is extracted from the mail address of the destination apparatus. However, this is not always necessary. For example, when the document 601 is sent not by an e-mail but using SMB (Server Message Block), the domain name used in specifying the destination apparatus can be extracted as the domain to which the destination apparatus belongs.

Further, according to the first exemplary embodiment, if the domain to which the multifunction peripheral 100 that performs copying or printing belongs or the domain to which the destination apparatus belongs and the domain extracted from the document 601 are not the same, it is determined whether such domains are in a trust relationship (steps S4 and S5). Further, by using the result of this determination, it is determined whether to perform the transmission or output of the document 601. However, if the domain to which the multifunction peripheral 100 that performs copying or printing belongs or the domain to which the destination apparatus belongs and the domain extracted from the document 601 are not the same, different processing may be taken. For example, in such a case, the document 601 may be determined not to be transmitted or output.

Further, in the first exemplary embodiment, trust relationship establishment information is stored in the domain controller 300. However, such information may also be stored in a multifunction peripheral 100 or an information processing apparatus 200.

Second Exemplary Embodiment

Next, a second exemplary embodiment of the present invention will be described in detail. In the first exemplary embodiment, access restriction information (information entered in the Trust field 801b, the Send field 801c, the Copy field 801d, and the Print field 801e) is embedded in the document 601. In the second exemplary embodiment, the access restriction information is stored in a multifunction peripheral 100 or an information processing apparatus 200. Thus, the second exemplary embodiment and the first exemplary embodiment are different only in their type of storage and usage of the access restriction information. Therefore, in the following description, a detailed description will be omitted for the components similar to those in the first exemplary embodiment.

FIG. 10A illustrates an example of information embedded in the document 601. FIG. 10B illustrates an example of information stored in the multifunction peripheral 100 or the information processing apparatus 200.

In the document 601, domain information such as information entered in a table 1001 shown in FIG. 10A is embedded. In a Domain field 1001a of the table 1001, a domain to which the document 601 belongs is entered as domain information.

In the disk 201 of the multifunction peripheral 100 or the disk 301g of the information processing apparatus 200, access restriction information such as information entered in a table 1002 shown in FIG. 10B is stored.

In a Trust field 1002a in FIG. 10B, a status of access restriction to a domain in a trust relationship is entered as access restriction information. In a Send field 1002b, a status of access restriction regarding transmission of the document 601 is entered as access restriction information. In a Copy field 1002c, a status of access restriction regarding copying of the document 601 is entered as access restriction information. In a Print field 1002d, a status of access restriction regarding printing of the document 601 is entered as access restriction information. When there is no access restriction, "Permit" is entered in each of the fields 1002a-1002d, whereas "Deny" is entered when there is access restriction.

It is to be noted that the information entered in the Domain field 1001a in FIG. 10A and the information entered in The Trust field 1002a, the Send field 1002b, the Copy field 1002c, and the Print field 1002d denotes the same as the information entered in the table 801 in FIG. 8.

Referring now to FIGS. 6 and 7, an example of an access restriction method for a document which belongs to the third domain 10c will be described. In FIGS. 6 and 7, "A" representing the third domain 10c is entered in the Domain field 1001a and "Deny" is entered in the Trust field 1002a, the Send field 1002b, the Copy field 1002c, and the Print field 1002d. Further, the access restriction information is not embedded in the document 601 but stored in the disk 201 in the multifunction peripheral 100 (100a or 100b in FIG. 1) in the first domain 10a.

Then, as shown in FIG. 6, the document 601 is allowed to be copied or printed by the multifunction peripheral 100 (100e and 100f in FIG. 1) in the third domain 10c. Also, the document 601 is allowed to be transmitted from the multifunction peripheral 100 (100e or 100f in FIG. 1) in the third domain 10c to the information processing apparatus 200 (200g-200i in FIG. 1) in the third domain 10c, but allowed not to the multifunction peripheral 100 (100a or 100b in FIG. 1), the information processing apparatus 200 (200a-200c in FIG. 1), and the user 600a in the first domain 10a.

On the other hand, as shown in FIG. 7, the document 601 is not allowed to be copied or printed by the multifunction peripheral 100 (100a or 100b in FIG. 1) in the first domain 10a. Further, the document 601 is not allowed to be transmitted to the information processing apparatus 200 (200a-200c in FIG. 1) and the user 600a in the first domain 10a. On the other hand, the document 601 is allowed to be transmitted to the multifunction peripheral 100 (100e or 100f in FIG. 1), the information processing apparatus 200 (200g-200i in FIG. 1), and the user 600c in the third domain 10c. Also, the document 601 is allowed to be printed by the multifunction peripheral 100 (100e or 100f in FIG. 1).

For example, when "Permit" is entered in the Trust field 1002a of the table 1002, the transmission of the document 601 to the multifunction peripheral 100 (100a or 100b in FIG. 1), the information processing apparatus 200 (200a-200c in FIG. 1), and the user 600a in the first domain 10a is not restricted. Also, copying and printing of the document 601 by the multifunction peripheral 100 (10a or 100b in FIG. 1) in the first domain 10a is not restricted. This is because, as described earlier, the first domain 10a and the third domain 10c are in a trust relationship.

When the multifunction peripheral 100 and the information processing apparatus 200 perform an operation such as transmission, printing, or copying of the document 601, the multifunction peripheral 10a and the information processing apparatus 200 refer to the domain information stored in the Domain field 1001a of the table 1001 which is embedded in the document 601 and confirm the domain which the document 601 belongs to. The multifunction peripheral 100a and the information processing apparatus 200 also refer to the access restriction information in the Trust field 1002a, the Send field 1002b, the Copy field 1002c, and the Print field 1002d of the table 1002 and check the content of the information.

For example, if "A" which represents the third domain 10c is entered in the Domain field 1001a in the table 1001, and "Deny" is entered in the Trust field 1002a, the Send field 1002b, the Copy field 1002c, and the Print field 1002d, then transmission of the document 601 to domains other than the third domain 10c as well as printing and copying of the document 601 by a multifunction peripheral 100 in a domain other than the domain 10c are prohibited.

It is to be noted that the configuration, access restriction items, and information indicating whether access is to be restricted contained in the tables 1001 and 1002 are exemplary and shall not be construed as limited to those shown in FIGS. 10A and 10B.

Figure 11:
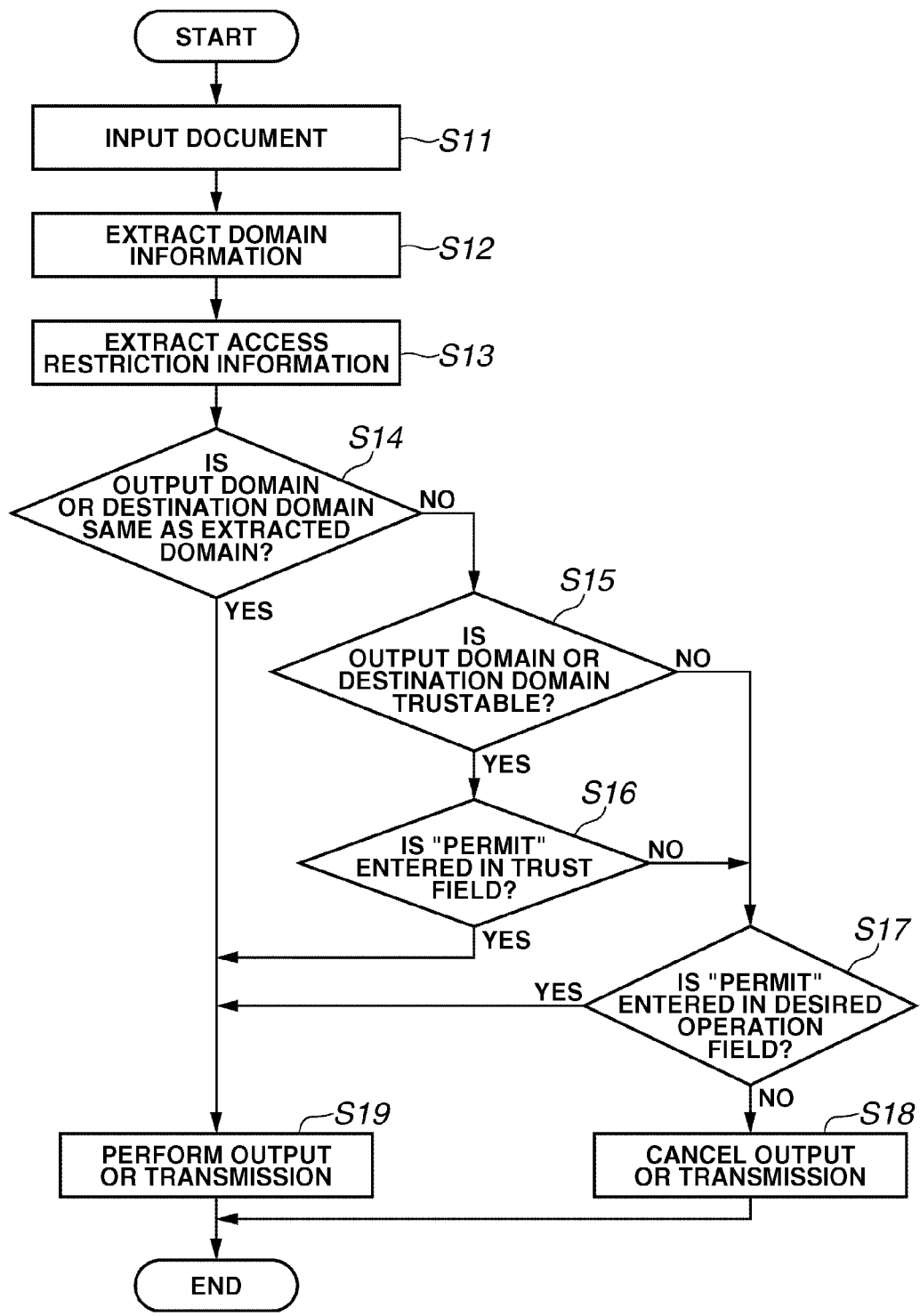
FIG. 11 is a flowchart showing an example of processing in a network system which performs access restriction according to the second exemplary embodiment of the present invention.

FIG. 11 is a flowchart showing an example of processing in a network system when access restriction is performed. In FIG. 11, the multifunction peripheral 100 is taken as an exemplary apparatus for managing the document 601 by performing access restriction.

First, in step S11, data of the document 601 is input into the multifunction peripheral 100. When the document 601 is a physical medium such as paper, the scan engine 103 scans the document 601 to generate image data. Then, the CPU 101a loads the generated image data to the RAM 101b. When the document 601 is in an electronic form (hereinafter referred to as image data), the CPU 101a loads the image data input through the communications interface 102 or the image data stored in the disk 201 to the RAM 101b.

In step S12, the CPU 101a extracts the table 1001 which is embedded in the image data loaded to the RAM 101b in step S11. Then, the CPU 101a extracts the domain information entered in the Domain field 1001a from the table 1001.

In step S13, the CPU 101a extracts the table 1002 if the table 1002 is stored in a disk 201 which is interconnected to the CPU 101a and acquires the access restriction information contained in the table 1002. If the table 1002 is stored in an external processing apparatus, the CPU 101a acquires the access restriction information contained in the table 1002 from the external processing apparatus through the communications interface 102.

As a method for acquiring the access restriction information from the external processing apparatus, there is, for example, a method in which the CPU 101a acquires the access restriction information from the external processing apparatus by accessing the external processing apparatus at regular intervals or at step S13. Prior to this process, the user needs to register information on the external processing apparatus in the multifunction peripheral 100 (e.g., disk 201). This information is used when the CPU 101a accesses the external processing apparatus. The access restriction information may also be transmitted automatically from the external processing apparatus to the multifunction peripheral 100.

Then, the CPU 101a loads the acquired access restriction information to the RAM 101b.

In step S14, if the CPU 101a determines to copy or print the document 601, the CPU 101a extracts the domain information on a multifunction peripheral 100 which performs copying or printing from, for example, the disk 201. Also, if the CPU 101a determines to transmit the document 601, the CPU 101a extracts a domain of the destination apparatus, for example, from an e-mail address of the destination apparatus. Then, the CPU 101a determines whether the domain of the multifunction peripheral 100 which performs copying or printing or the domain of the destination apparatus (e.g., the information processing apparatus 200) and the domain extracted in step S12 are the same.

As a result of this determination, if the domain of the multifunction peripheral 100 which performs copying or printing or the domain of the destination apparatus and the domain extracted in step S12 are the same, the process proceeds to step S19. In step S19, the CPU 101*a* controls the multifunction peripheral 100 which performs copying or printing based on the image data of the document 601 or transmits image data of the document 601 to the destination apparatus through the communications interface 102. In this manner, the multifunction peripheral 100 copies or prints the document 601 or the destination apparatus receives the image data of the document 601.

It is to be understood that, in step S19, the CPU 101*a* causes the scanner engine 103 and the printer engine 104 to copy or print the document 601.

On the other hand, if the domain of the multifunction peripheral 100 which performs copying or printing or the domain of the destination apparatus and the domain extracted in step S12 are not the same, the process proceeds to step S15.

In step S15, the CPU 101*a* determines whether the domain of the multifunction peripheral 100 which performs copying or printing or the domain of the destination apparatus and the domain extracted in step S12 are in a trust relationship. The CPU 101*a* makes this determination according to the trust relationship establishment information stored as described above.

As a result of this determination, if the domain of the multifunction peripheral 100 which performs copying or printing or the domain of the destination apparatus and the domain extracted in step S12 are not in a trust relationship, the process proceeds to step S17.

On the other hand, if the domain of the multifunction peripheral 100 which performs copying or printing or the domain of the destination apparatus and the domain extracted in step S12 are in a trust relationship, the process proceeds to step S16. In step S16, the CPU 101*a* determines whether the information entered in the Trust field 1002*a* is "Permit" based on the access restriction information extracted in step S13. As a result of this determination, if the information in the Trust field 1002*a* is "Permit", access restriction is not performed and the process proceeds to the aforementioned step S19.

On the other hand, if the information entered in the Trust field 1002*a* is not "Permit" but "Deny", the process proceeds to step S17.

In step S17, the CPU 101*a* checks the access restriction information extracted in step S13 and determines whether the information entered in the field corresponding to the operation to be performed is "Permit". Such field corresponding to the operation to be performed is any of the fields 1002*b*-1002*d*. As a result of this determination, if the information entered in the field of the operation to be performed is "Permit", the process proceeds to the aforementioned step S19.

On the other hand, if the field of the operation to be performed is not "Permit" but "Deny", the process proceeds to step S18. In step S18, the CPU 101*a* cancels processing for the operation which is to be performed.

It is to be noted that the flowchart shown in FIG. 11 illustrates merely an example of processing in a network system when an access restriction is performed similarly to that described in FIG. 9. For example, in addition to the multifunction peripheral 100, an information processing apparatus 200 may also be used in performing the access restriction according to the flowchart shown in FIG. 11.

As described above, according to the second exemplary embodiment, the domain information is embedded in the document 601, whereas the access restriction information is stored in the multifunction peripheral 100 or the information processing apparatus 200. Then, based on the domain information and the access restriction information, copying, printing, and transmission of the document 601 are controlled. In this manner, in addition to the effect described in the first exemplary embodiment, the second exemplary embodiment is advantageous in that it does not need to embed the document 601 with a lot of access restriction information. Consequently, the access restriction information can be used more easily. Further, an application of the document 601 can be changed according to domains (10*a*-10C). For example a domain may be able to transmit the document 601 to its outside contact whereas a different domain may not be able to transmit the document 601 to its outside contact, so that different type of access restriction can be performed depending on the situation.

Other Exemplary Embodiments

In order to achieve the functions of the aforementioned exemplary embodiments by operating various types of devices, program code of software may also be introduced to an apparatus which is connected to the various types of devices or to a computer in a system. A result of the operation achieved by the operation of the various types of devices according to the program stored in the system or the computer of the apparatus (a CPU or an MPU) also falls within the scope of the present invention.

In this case, the program code of the software itself realizes the functions of the aforementioned exemplary embodiments. Further, the program code itself and a unit configured to providing the program code to the computer, for example, a recording medium which stores the program code, comprises the present invention. A recording medium for storing the program code includes, for example, a flexible disk, a hard disk, an optical disk, a magneto-optical disk, a CD-ROM, a magnetic tape, a non-volatile memory card, and a ROM.

The functions of the aforementioned embodiments are implemented when the provided program code is executed by a computer. Additionally, when the program code is used together with an operating system or application software running on a computer, such program code is also included in the exemplary embodiments.

Further, the provided program code is stored in a memory equipped for a function expanding board of a computer and then, based on the instruction of the program code, a CPU equipped for the function expanding board performs the whole or a part of the actual processing. A case where the functions of the aforementioned exemplary embodiments are realized according to this processing is also included in the present invention.

Furthermore, after the provided program code is stored in a memory equipped for a function expanding unit connected to a computer, a CPU or the like which is provided with the function expanding unit performs the whole or a part of the actual processing based on the instruction of the program code. A case where the functions of the aforementioned exemplary embodiments are realized according to this processing is also included in the present invention.

According to an exemplary embodiment of the present invention, document domain information indicating a domain to which a document belongs is acquired, and destination domain information indicating a domain to which a destination of the document belongs is acquired. Based on the document domain information and the destination domain information, it is determined whether to allow transmission of the document. Therefore, transmission of the document is controlled according to the destination of the document.

According to another exemplary embodiment of the present invention, when a domain indicated in the document domain information and a domain indicated in the destination domain information are different, it is determined whether the domains are in a trust relationship before determining whether to allow transmission of the document. In this way, transmission of the document to domains other than the domain indicated in the document domain information can be controlled.

Further, according to another exemplary embodiment of the present invention, information including document location information indicating a domain to which a document belongs is embedded in the document. In this manner, the domain to which the document belongs can be acquired from the document, and transmission of the document can be controlled.

Furthermore, according to another exemplary embodiment of the present invention, when the document is a physical medium, the document is embedded with copy-forgery-inhibited pattern information, a digital watermarking, or a QR code as the embedded information, whereas when the document is in an electronic form, such embedded information is incorporated into the electronic data. In this way, a destination of the document as a physical medium and the document in an electronic form can be controlled.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-011647 filed Jan. 19, 2006, which is hereby incorporated by reference herein in its entirety.

What is claimed is:

1. An apparatus comprising:
a first acquisition unit configured to acquire document domain information indicating a domain to which a document belongs;
a second acquisition unit configured to acquire at least destination domain information indicating a destination domain of transmission of the document which is different from a domain to which the apparatus belongs;
a determination unit configured to compare between the domain indicated by the document domain information acquired by the first acquisition unit and the destination domain indicated by the destination domain information acquired by the second acquisition unit to determine, using at least one processor, whether to allow transmission of the document from the apparatus to the destination domain; and
a transmission unit configured to, even though the destination domain is different from the domain to which the apparatus belongs, transmit the document from the apparatus to the destination domain if transmission of the document is allowed.

2. The apparatus of claim 1, wherein the domain to which the document belongs is a domain from which the document is being transmitted.

3. The apparatus according to claim 1, wherein the determination unit allows transmission of the document if the domain indicated in the document domain information is the same as the domain indicated in the destination domain information.

4. The apparatus according to claim 1, wherein, if the domain indicated in the document domain information is different from the domain indicated in the destination domain information, the determination unit determines whether the domain indicated in the document domain information and the domain in the destination domain information are in a trust relationship, and determines whether to allow transmission of the document based on a result of the determination.

5. The apparatus according to claim 4, further comprising a third acquisition unit configured to acquire access restriction information including information indicating whether to allow transmission of the document to an apparatus belonging to a domain which is in a trust relationship with the domain indicated in the document domain information,
wherein, if the domain indicated in the document domain information and the domain indicated in the destination domain information are in a trust relationship, the determination unit allows transmission of the document when the third acquisition unit acquires information indicating that the transmission of the document to the apparatus in the domain which is in a trust relationship with the domain indicated in the document domain information is allowed.

6. The apparatus according to claim 5, wherein the access restriction information further includes information indicating whether to allow a predetermined operation on the document, and
wherein, if the domain indicated in the document domain information and the domain indicated in the destination domain information are not in a trust relationship, the determination unit allows transmission of the document when the third acquisition unit acquires information indicating that the predetermined operation instructed from a user to perform is allowed.

7. The apparatus according to claim 6, wherein the third acquisition unit acquires the access restriction information from the document.

8. The apparatus according to claim 5, wherein the third acquisition unit acquires the access restriction information from a recording medium different from the document.

9. The apparatus according to claim 1, further comprising an embedding unit configured to embed the document domain information in the document.

10. The apparatus according to claim 9, wherein the embedding unit performs at least one of embedding the document domain information in a form of copy-forgery-inhibited pattern, digital watermarking, or QR code when the document is in a physical medium, or incorporating the document domain information in the document when the document is in an electronic form.

11. An apparatus comprising:
a first acquisition unit configured to acquire document domain information indicating a domain, the document domain information being included in a document;
a second acquisition unit configured to acquire at least destination domain information indicating a destination domain of transmission of the document which is different from a domain to which the apparatus belongs;
a determination unit configured to compare between the domain indicated by the document domain information acquired by the first acquisition unit and the destination domain indicated by the destination domain information acquired by the second acquisition unit to determine, using at least one processor, whether to allow transmission of the document from the apparatus to the destination domain; and a transmission unit configured to, even though the destination domain is different from the domain to which the apparatus belongs, transmit the document from the apparatus to the destination domain if transmission of the document is allowed.

12. A method comprising:
acquiring document domain information, the document domain information indicating a domain to which a document belongs;
acquiring, at least destination domain information, the destination domain information indicating a destination domain of transmission of the document from an apparatus which is different from a domain to which the apparatus belongs;
comparing the domain indicated by the acquired document domain information and the domain indicated by the acquired destination domain information to determine, using at least one processor, whether to allow transmission of the document from the apparatus to the destination domain; and
transmitting, even though the destination domain is different from the domain to which the apparatus belongs, the document from the apparatus to the destination domain if transmission of the document is allowed.

13. The method of claim 12, wherein the domain to which the document belongs is a domain from which the document is being transmitted.

14. The method according to claim 12, further comprising allowing transmission of the document if the domain indicated in the document domain information is the same as the domain indicated in the destination domain information.

15. The method according to claim 12, further comprising, if the domain indicated in the document domain information is different from the domain indicated in the destination domain information, determining whether the domain indicated in the document domain information and the domain indicated in the destination domain information are in a trust relationship, and determining whether to allow transmission of the document according to a result of the determination.

16. The method according to claim 15, further comprising:
acquiring access restriction information including information indicating whether to allow transmission of the document to an apparatus belonging to a domain which is in a trust relationship with the domain indicated in the document domain information; and
if the domain indicated in the document domain information and the domain indicated in the destination domain information are in a trust relationship, allowing transmission of the document when information indicating that the transmission of the document to the apparatus in the domain which is in a trust relationship with the domain indicated in the document domain information is allowed is acquired.

17. The method according to claim 16, wherein the access restriction information further includes information indicating whether to allow a predetermined operation on the document, and
wherein the document processing method further comprises, if the domain indicated in the document domain information and the domain indicated in the destination domain information are not in a trust relationship, allowing transmission of the document when information indicating the predetermined operation instructed from a user to perform is allowed is acquired.

18. The method according to claim 16, further comprising acquiring the access restriction information from a recording medium different from the document.

19. The method according to claim 16, further comprising acquiring the access restriction information from the document.

20. The method according to claim 12, further comprising embedding the document domain information in the document.

21. The method according to claim 20, wherein the embedding the domain information includes at least one of embedding the document domain information in a form of copy-forgery-inhibited pattern, digital watermarking, or QR code when the document is a physical medium, or incorporating the document domain information in the document when the document is in an electronic form.

22. A non-transitory computer-readable medium storing instructions which, when executed by an apparatus, causes the apparatus to perform operations comprising:
acquiring document domain information, the document domain information indicating a domain to which a document belongs;
acquiring at least destination domain information, the destination domain information indicating a destination domain of transmission of image data which is different from a domain to which the apparatus belongs;
comparing the domain indicated by the acquired document domain information and the domain indicated by the acquired destination domain information to determine whether to allow transmission of the document from the apparatus to the destination domain; and
causing, even though the destination domain is different from the domain to which the apparatus belongs, the apparatus to transmit the document from the apparatus to the destination domain if transmission of the document is allowed.

23. A method comprising:
acquiring document domain information indicating a domain, the document domain information being included in a document;
acquiring, at least destination domain information, the destination domain information indicating a destination domain of transmission of the document from an apparatus which is which is different from a domain to which the apparatus belongs;
comparing the domain indicated by the acquired document domain information and the domain indicated by the acquired destination domain information to determine, using at least one processor, whether to allow transmission of the document from the apparatus to the destination domain; and
transmitting, even though the destination domain is different from the domain to which the apparatus belongs, the document from the apparatus to the destination domain if transmission of the document is allowed.

* * * * *